United States Patent
Yoo et al.

(10) Patent No.: US 8,924,985 B2
(45) Date of Patent: Dec. 30, 2014

(54) NETWORK BASED REAL-TIME VIRTUAL REALITY INPUT/OUTPUT SYSTEM AND METHOD FOR HETEROGENEOUS ENVIRONMENT

(75) Inventors: Byung In Yoo, Seoul (KR); Hyung Min Yoon, Seoul (KR); Kyung Hwan Kim, Yongin Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 595 days.

(21) Appl. No.: 12/929,168

(22) Filed: Jan. 5, 2011

(65) Prior Publication Data
US 2011/0197201 A1    Aug. 11, 2011

(30) Foreign Application Priority Data
Feb. 9, 2010    (KR) ................. 10-2010-0011857

(51) Int. Cl.
G06F 9/46    (2006.01)
G06F 13/00    (2006.01)
G06F 9/50    (2006.01)
G06F 9/54    (2006.01)

(52) U.S. Cl.
CPC ...... *G06F 9/5027* (2013.01); *G06F 2209/5018* (2013.01); *G06F 2209/5011* (2013.01); *G06F 9/544* (2013.01)
USPC ......................................... 719/313; 718/105

(58) Field of Classification Search
CPC ................. G06F 9/644; G06F 9/5027; G06F 2209/5018; G06F 2209/5011
USPC .......................................... 719/313; 718/100
See application file for complete search history.

(56) References Cited

U.S. PATENT DOCUMENTS

| | | |
|---|---|---|
| 5,548,735 A | 8/1996 | Chen et al. |
| 5,774,878 A * | 6/1998 | Marshall ................. 705/36 R |
| 5,909,218 A | 6/1999 | Naka et al. |
| 6,681,629 B2 | 1/2004 | Foxlin et al. |
| 6,891,518 B2 | 5/2005 | Sauer et al. |
| 7,162,054 B2 * | 1/2007 | Meisner et al. ............. 382/103 |
| 8,244,919 B2 * | 8/2012 | Kim et al. ..................... 710/5 |
| 2002/0036649 A1 * | 3/2002 | Kim et al. ................... 345/633 |
| 2002/0113752 A1 * | 8/2002 | Sullivan et al. ................ 345/6 |
| 2003/0115358 A1 * | 6/2003 | Yun ............................ 709/238 |
| 2003/0179308 A1 * | 9/2003 | Zamorano et al. ...... 348/333.12 |
| 2004/0044720 A1 * | 3/2004 | Jang et al. .................. 709/200 |
| 2005/0275722 A1 * | 12/2005 | Evers-Senne et al. ....... 348/169 |

(Continued)

FOREIGN PATENT DOCUMENTS

| | | |
|---|---|---|
| KR | 1995-0009407 | 4/1995 |
| KR | 1997-0049513 | 7/1997 |

(Continued)

*Primary Examiner* — Emerson Puente
*Assistant Examiner* — Willy W Huaracha
(74) *Attorney, Agent, or Firm* — Staas & Halsey LLP (57) ABSTRACT

A network based real-time virtual reality input/output system and method for a heterogeneous environment are provided. The virtual reality input/output system transfers data received from a plurality of virtual reality input device and a request from a plurality of virtual reality applications to at least one corresponding virtual reality data generator among a plurality of virtual reality data generators, and transfers virtual reality data, which is generated by processing data corresponding to the request among the received data by the at least one corresponding virtual reality data generator, to the virtual reality application which transmits the request.

15 Claims, 11 Drawing Sheets

(56) References Cited

U.S. PATENT DOCUMENTS

| | | | |
|---|---|---|---|
| 2006/0017654 A1* | 1/2006 | Romo | 345/7 |
| 2007/0156869 A1* | 7/2007 | Galchev et al. | 709/223 |
| 2009/0154293 A1* | 6/2009 | Sengupta et al. | 367/118 |

FOREIGN PATENT DOCUMENTS

| | | |
|---|---|---|
| KR | 2003-0056302 | 7/2003 |
| KR | 10-2006-0061507 | 6/2006 |
| KR | 10-2009-0056792 | 6/2009 |

* cited by examiner

NETWORK BASED REAL-TIME VIRTUAL REALITY INPUT/OUTPUT SYSTEM AND METHOD FOR HETEROGENEOUS ENVIRONMENT

CROSS-REFERENCE TO RELATED APPLICATIONS

This application claims the priority benefit of Korean Patent Application No. 10-2010-0011857, filed on Feb. 9, 2010, in the Korean Intellectual Property Office, the disclosure of which is incorporated herein by reference.

BACKGROUND

1. Field

Embodiments relate to a network based real-time virtual reality input/output system and method for a heterogeneous environment.

2. Description of the Related Art

As a result of examination of three-dimension (3D) related technologies and 3D related market trends, new media services based on 3D contents will be introduced into the home. Film companies and consumer electronics are seeking cooperation to spread 3D contents in the home. To transmit 3D contents to the home, interest in 3D broadcasting technologies is being increased, and a pilot broadcasting of 3D broadcasting services have been provided on BS-11 in Japan. Also, broadcasting related enterprises are actively attempting to develop standardized compression and transmission schemes to regularly provide 3D broadcasting services.

3D Virtual World (VW) services are expected to be used as new home entertainment services with immersive motion-based games. To lead new entertainment businesses in world TV markets based on the above trends, a Virtual Reality Entertainment System (VRES) has been developed. The VRES may enable users to enjoy motion-based experiences, such as virtual touring, virtual sports or virtual gaming, in a realistic virtual environment on a large-sized display screen. The VRES may sense a user's motions and provide Full High Definition (FHD) 3D graphics and realistic avatars, to provide users with new experiences in home display devices such as TVs which are entirely different from conventional game consoles.

Accordingly, there is a desire for a system and method that may effectively control virtual reality input/output.

SUMMARY

In accordance with aspects of one or more embodiments, there is provided a virtual reality input/output system including a data receiver to receive data from a plurality of virtual reality input devices, a plurality of virtual reality data generators to generate corresponding virtual reality data based on the received data, and a virtual reality input/output unit to transfer a request of at least one of a plurality of virtual reality applications to at least one corresponding virtual reality data generator among the plurality of virtual reality data generators, and to transfer virtual reality data to the virtual reality application which transmits the request, the virtual reality data being generated by processing data corresponding to the request among the received data by the at least one corresponding virtual reality data generator.

The virtual reality input/output unit may perform, using a thread pool, scheduling and load balancing for each request received from each of the plurality of virtual reality applications and for the data received from each of the plurality of virtual reality input devices, and the virtual reality input/output unit may transfer the request and data to a corresponding virtual reality data generator among the plurality of virtual reality data generators.

The virtual reality input/output unit may communicate with the plurality of virtual reality applications using a network protocol independent from a predetermined Operating System (OS), or using an Inter-Process Communication (IPC).

The virtual reality input/output system may further include a real-time signal manager to manage a high resolution timer. The virtual reality input/output unit may transmit the virtual reality data corresponding to the request in real-time to the virtual reality application, which transmits the request, using the high resolution timer.

In accordance with aspects of one or more embodiments, there is provided a virtual reality input/output method including receiving data from a plurality of virtual reality input devices, receiving a request from at least one of a plurality of virtual reality applications, transmitting the request and at least part of the received data to at least one corresponding module among a plurality of modules, the plurality of modules generating virtual reality data, and transmitting virtual reality data to the virtual reality application which transmits the request, the virtual reality data being generated by processing the at least part of the received data by the at least one module.

According to another aspect of embodiments, there is provided at least one computer readable medium storing computer readable instructions to implement methods of embodiments.

BRIEF DESCRIPTION OF THE DRAWINGS

These and/or other aspects of embodiments will become apparent and more readily appreciated from the following description, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
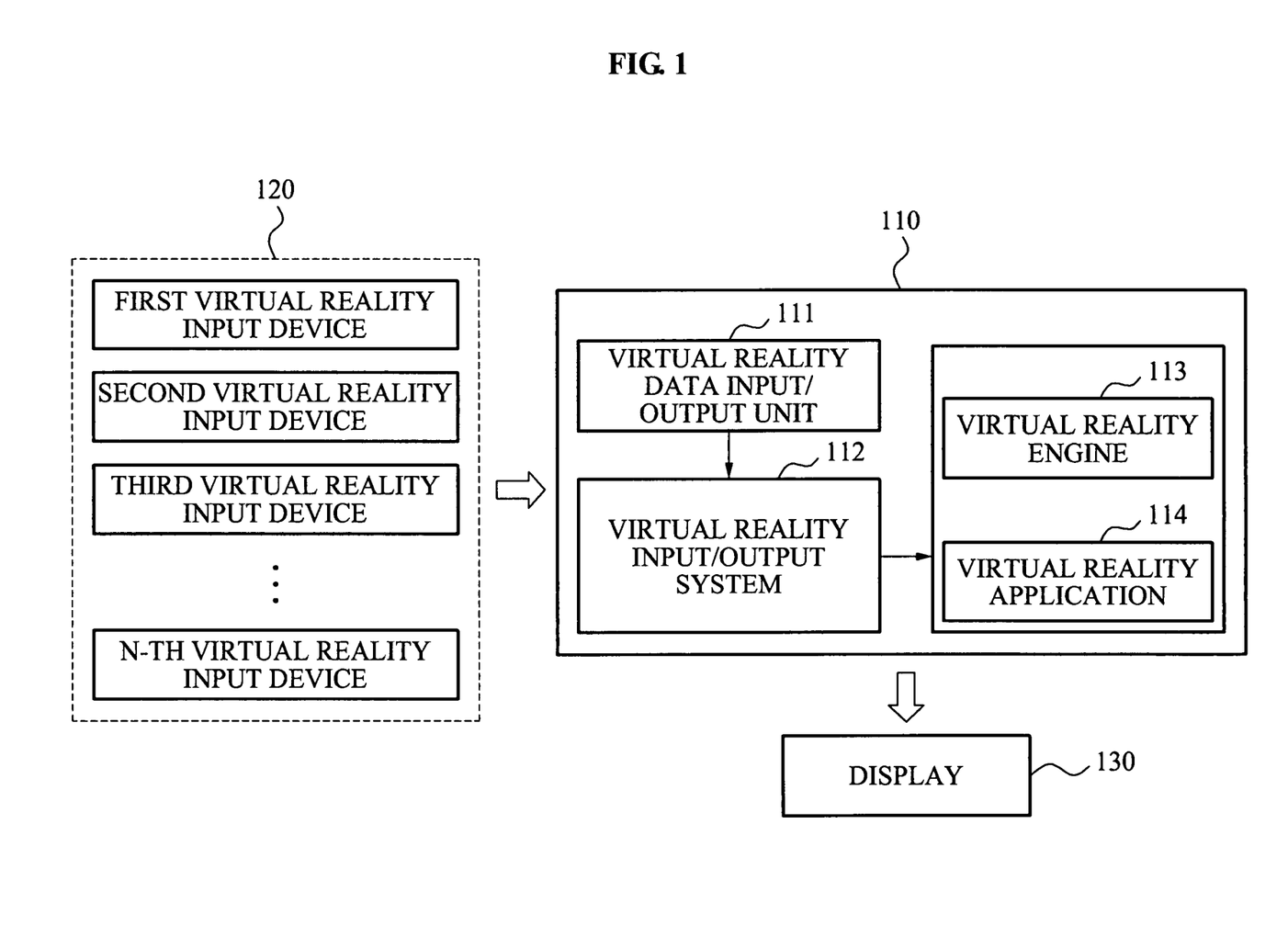
FIG. 1 schematically illustrates a block diagram of a Virtual Reality Entertainment System (VRES) including a virtual reality input/output system according to embodiments.

FIG. 1 schematically illustrates a block diagram of a Virtual Reality Entertainment System (VRES) 110 including a virtual reality input/output system 112 according to embodiments. The VRES 110 may enable a user to enjoy motion-based experiences, such as virtual touring, virtual sports or virtual gaming, in a realistic virtual environment on a large-sized display screen. In FIG. 1, the VRES 110 may include a virtual reality data input/output unit 111, the virtual reality input/output system 112, a virtual reality engine 113, and a virtual reality application 114. Also, the VRES 110 may be connected to a plurality of virtual reality input devices 120 and a display 130, or may include the plurality of virtual reality input devices 120 and the display 130. While the virtual reality input/output system 112 is included in the VRES 110 in an embodiment, the virtual reality input/output system 112 may be implemented as a separate system to communicate with the VRES 110 through a network protocol independent from a predetermined Operating System (OS). The network protocol may include, for example, a Transmission Control Protocol (TCP), or a User Datagram Protocol (UDP). As illustrated in FIG. 1, the virtual reality input/output system 112 in the VRES 110 may communicate with the virtual reality engine 113 and the virtual reality application 114 using an Inter-Process Communication (IPC) independent from a predetermined OS.

The virtual reality input/output system 112 may have a structure, which is independent from an execution environment of the VRES 110 to stably process inputs and outputs of multiple users for virtual reality in real-time (hereinafter, virtual reality inputs and outputs). First, the virtual reality input/output system 112 may unify all the virtual reality inputs and outputs, and may service the unified inputs and outputs to a single process. The plurality of virtual reality input devices 120, for example a color camera, a depth camera, and a motion sensor, may be connected to the virtual reality data input/output unit 111 where a Universal Serial Bus (USB) module, an Institute of Electrical and Electronics Engineers (IEEE) 1394 port, a Bluetooth module and the like are combined in a single unit. The virtual reality data input/output unit 111 may transfer signals generated by the virtual reality input devices 120 to the virtual reality input/output system 112. When the virtual reality input/output system 112 is implemented as a separate system as described above, the virtual reality input/output system 112 may include the virtual reality data input/output unit 111.

The virtual reality input/output system 112 may perform operations such as three-dimensional (3D) face modeling, 3D body modeling, 3D face animation, 3D motion modeling, and remote multi-touch processing, using signals received from the virtual reality data input/output unit 111. After performing the above operations, the virtual reality input/output system 112 may generate the following virtual reality data:

Face geometry
Face texture
Face animation
Body geometry
Body texture
Body motion
Body gesture
Remote multi-touch gesture To receive the virtual reality data generated by the virtual reality input/output system 112, the virtual reality engine 113 or the virtual reality application 114 may link to a virtual reality input/output stub (VRIOStub) module (not shown), and may use an interface defined in a header portion of the virtual reality input/output stub module. The virtual reality input/output system 112 may communicate with the virtual reality input/output stub module through a virtual reality input/output proxy (VRIOProxy) module (not shown). In this instance, the virtual reality input/output stub module and the virtual reality input/output proxy module may transceive data through the network protocol or the IPC, as described above. Specifically, the virtual reality application 114 may request virtual reality data from the virtual reality input/output proxy module through the virtual reality input/output stub module. The virtual reality input/output system 112 may transmit the generated virtual reality data to the virtual reality input/output stub module through the virtual reality input/output proxy module, so that the virtual reality application 114 may receive the requested virtual reality data. Here, audio data may be processed directly by the virtual reality application 114 using an exclusive library.

Figure 2:
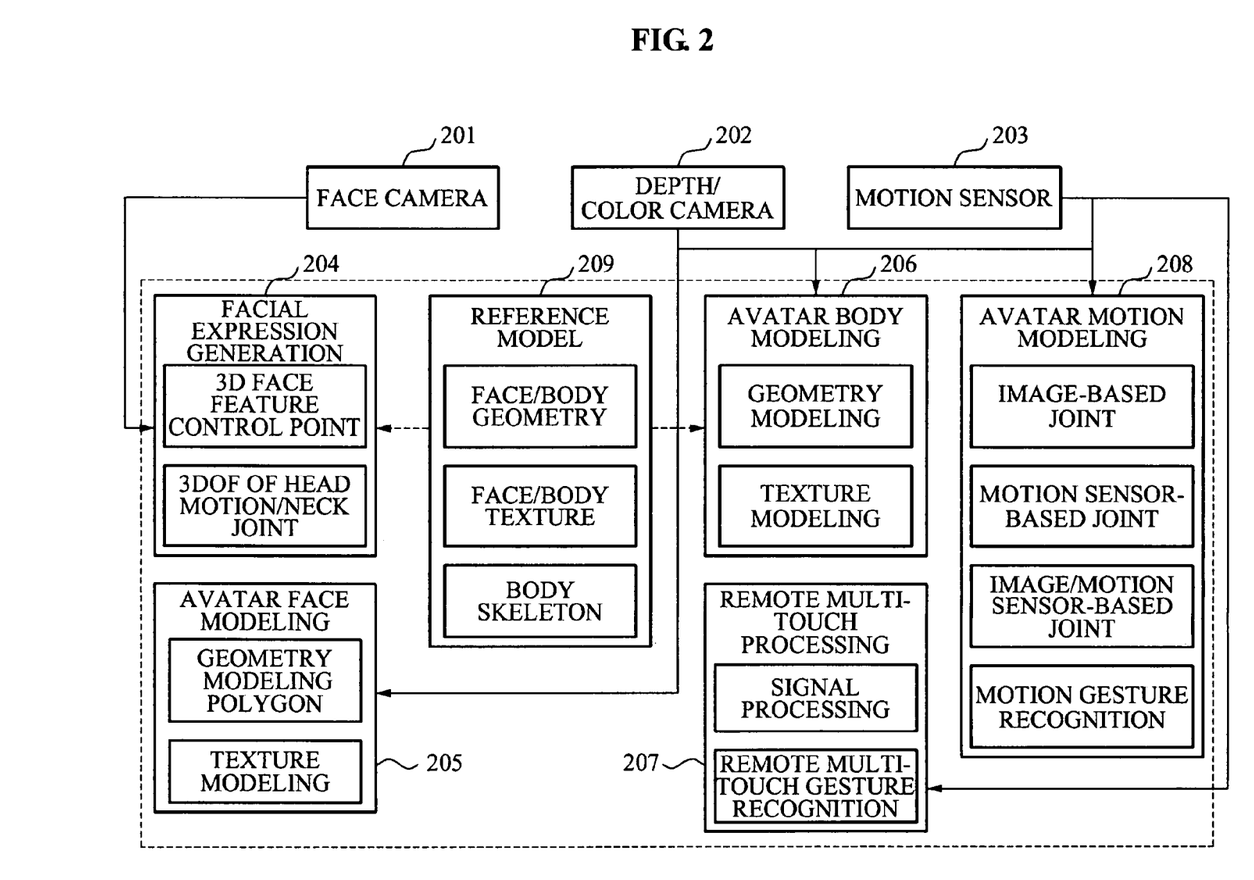
FIG. 2 illustrates an example of an operation of processing data received from a plurality of virtual reality input devices in a virtual reality input/output system according to embodiments.

FIG. 2 illustrates an operation of processing data received from a plurality of virtual reality input devices in a virtual reality input/output system according to embodiments. The virtual reality input/output system of FIG. 2 may correspond to the virtual reality input/output system 112 of FIG. 1, and accordingly, may receive data through the virtual reality data input/output unit 111. The data may be received from a plurality of virtual reality input devices 120, for example a face camera 201, a depth/color camera 202 and a motion sensor 203. The virtual reality input/output system of FIG. 2 may process the received data using modules for facial expression generation 204, avatar face modeling 205, avatar body modeling 206, remote multi-touch processing 207, and avatar motion modeling 208, and may then generate virtual reality data based on the processed data.

The module for facial expression generation 204 may generate virtual reality data regarding a 3D face feature control point and 3 Degrees of Freedom (DOF) of a head motion and neck joint, based on the data received through the face camera 201. For example, to realize a 3D face animation, the module for facial expression generation 204 may stream data, such as 3D face feature control points (for example, 54 points), face position data (x, y, z) and face rotation data (rx, ry, rz), in real-time at 30 frames or more per second. In this instance, the module for facial expression generation 204 may also use a reference model 209 to generate virtual reality data regarding 3D face feature control points, face position, and face rotation. Here, information regarding face/body geometry, face/body texture, and a body skeleton is stored in advance in the reference model 209.

The module for avatar face modeling 205 may generate virtual reality data regarding a geometry modeling polygon and texture modeling, based on the data received through the depth/color camera 202. For example, to realize 3D face modeling, the module for avatar face modeling 205 may generate data regarding a face geometry and a face texture (for example, a diffuse map and a normal map), in response to a request from a virtual reality application.

The module for avatar body modeling 206 may generate virtual reality data regarding a geometry modeling and texture modeling, based on the data received through the depth/color camera 202. For example, to realize 3D body modeling, the module for avatar body modeling 206 may generate data regarding a body geometry and a body texture (for example, a diffuse map and a normal map), in response to a request from a virtual reality application. In this instance, the module for avatar body modeling 206 may also use the reference model 209 to generate virtual reality data regarding the body geometry and the body texture, in the same manner as the module for facial expression generation 204.

The module for remote multi-touch processing 207 may generate virtual reality data regarding signal processing and remote multi-touch gesture recognition, based on the data received through the motion sensor 203. For example, the module for remote multi-touch processing 207 may stream a remote multi-touch gesture command in real-time at 30 frames or more per second.

The module for avatar motion modeling 208 may generate virtual reality data regarding an image-based joint, a motion sensor-based joint, an image/motion sensor-based joint, and motion gesture recognition, based on the data received through the depth/color camera 202 and the motion sensor 203. For example, to realize 3D motion modeling, the module for avatar motion modeling 208 may stream data regarding body motion joints (for example, 27 joints) and body gestures recognized by body motions in real-time at 30 frames or more per second.

Figure 3:
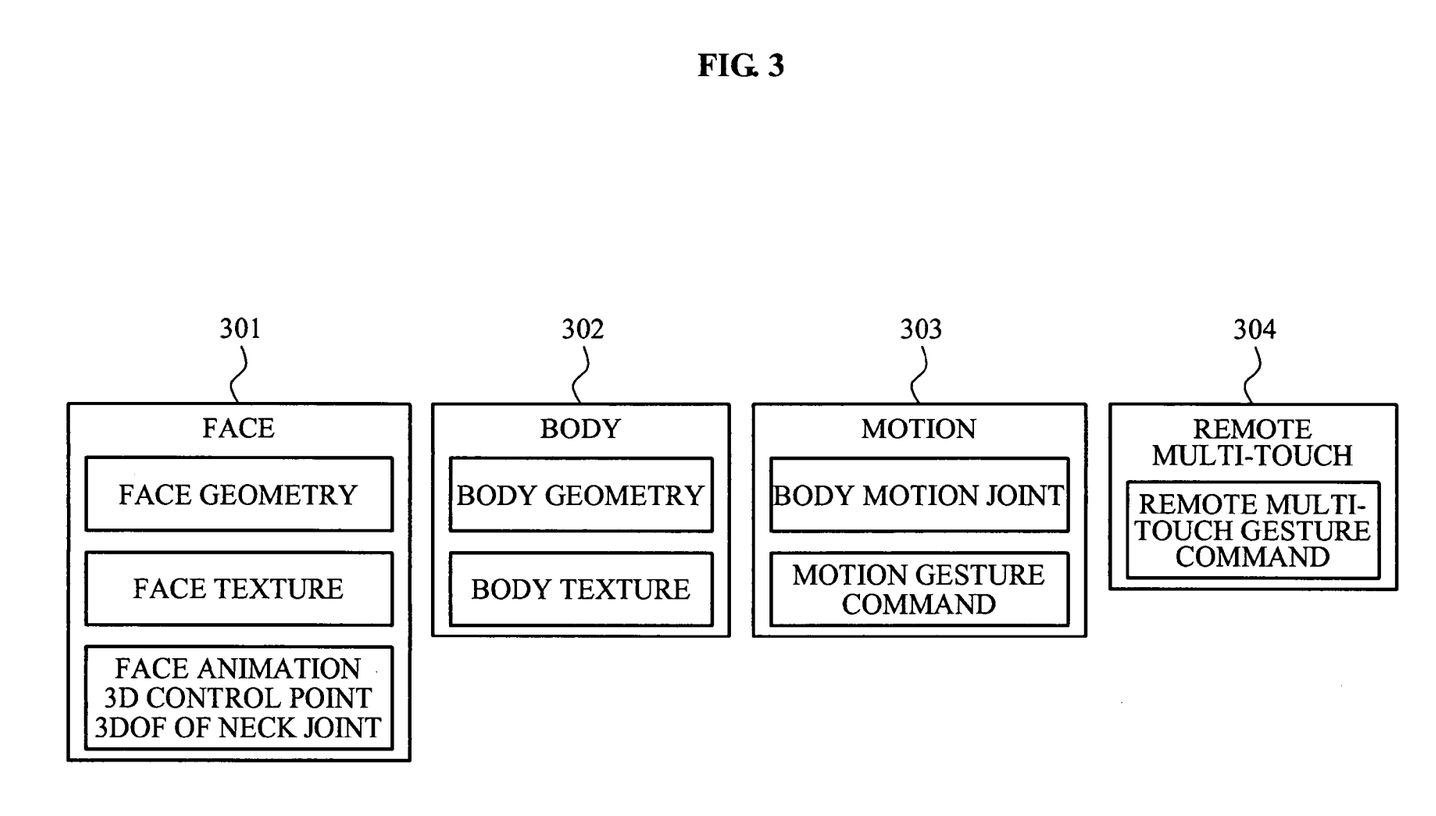
FIG. 3 illustrates an example of data generated by a virtual reality input/output system according to embodiments.

FIG. 3 illustrates an example of data generated by a virtual reality input/output system according to embodiments. As shown in FIG. 3, virtual reality data regarding a face 301, a body 302, a motion 303 and a remote multi-touch 304 may be generated as described above.

Figure 4:
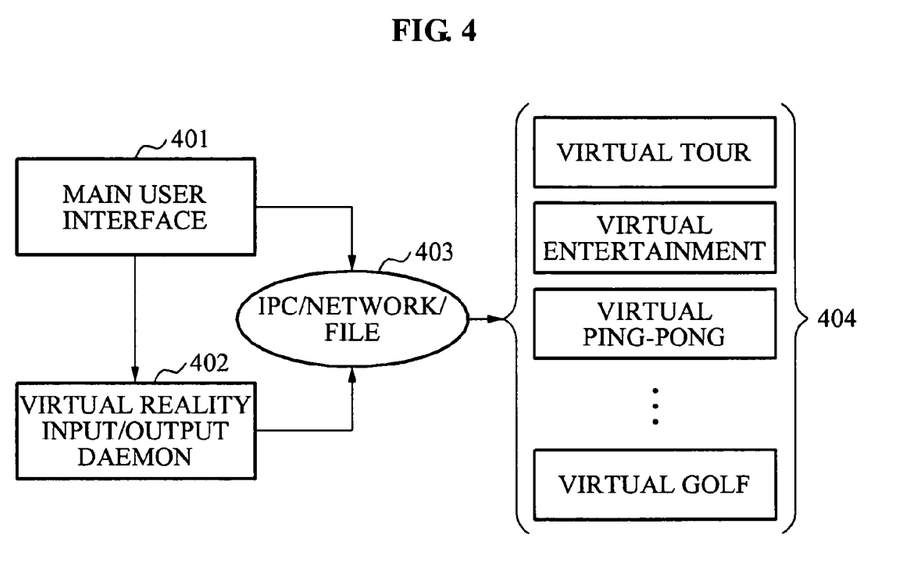
FIG. 4 illustrates examples of processes running in a VRES according to embodiments.

FIG. 4 illustrates examples of processes running in a VRES according to embodiments. Processes of a main user interface 401, a virtual reality input/output daemon 402 and a plurality of virtual reality applications 404 are shown in FIG. 4. Each of the processes may be individually performed, and may transceive data through an IPC/network/file 403. The main user interface 401 may be a process to select an executable virtual reality application from among the plurality of virtual reality applications 404 and to launch the selected application in the VRES. The virtual reality input/output daemon 402 may be a main process to process virtual reality inputs and outputs, and may be executed in the virtual reality input/output system 112 described with reference to FIG. 1. The plurality of virtual reality applications 404 may be a process to receive virtual reality data from the virtual reality input/output daemon 402 and to perform operations corresponding to the received data.

Figure 5:
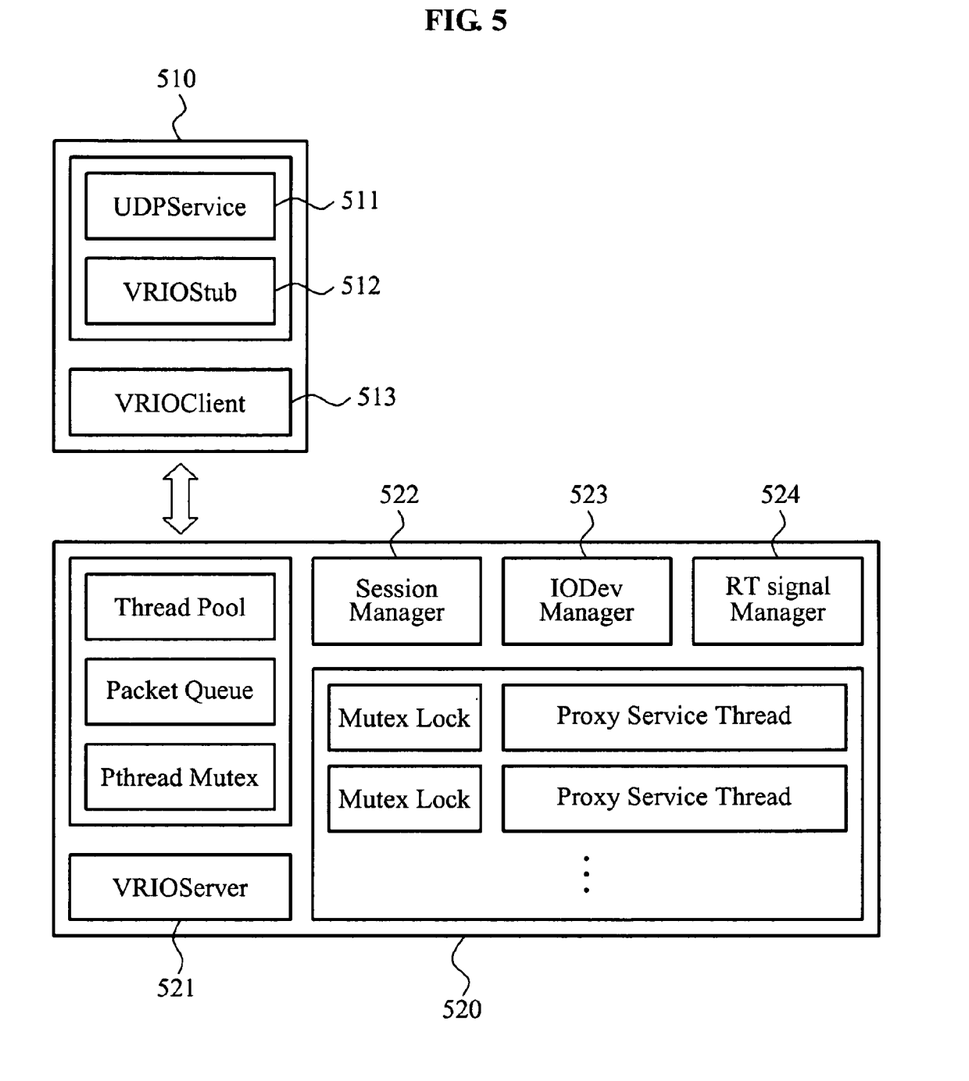
FIG. 5 illustrates an example of a virtual reality input/output system according to embodiments.

FIG. 5 illustrates an example of a virtual reality input/output system 520 according to embodiments. The virtual reality input/output system 520 may process a request from a virtual reality application 510, and is described below in greater detail with reference to FIG. 5.

As shown in FIG. 5, the virtual reality application 510 may include a UDPService 511, a VRIOStub 512, and a VRIOClient 513. The UDPService 511 may act to perform UDP communication with the virtual reality input/output system 520. The VRIOStub 512 may provide an interface which enables a function of the virtual reality input/output system 520 to be activated in the virtual reality application 510 using the UDPService 511. The VRIOClient 513 may combine functions of the UDPService 511 and VRIOStub 512 and manage the combined functions.

The virtual reality input/output system 520 may include a VRIOServer 521, a Session Manager 522, an IODev Manager 523 and an RT signal Manager 524, as shown in FIG. 5. The VRIOServer 521 may transfer a request from the VRIOClient 513 to an appropriate Proxy Service Thread generated in the virtual reality input/output system 520, using a thread pool, a packet queue, and a POSIX thread (Pthread) mutex, and may transfer a result of processing performed in the Proxy Service Thread to the VRIOClient 513. Here, Pthread refers to a standard Application Programming Interface (API) provided to prepare software running in parallel, and mutex refers to mutual exclusion. The Proxy Service Thread may process the request from the VRIOClient 513 using the modules described above with reference to FIG. 2. Specifically, the Proxy Service Thread may appropriately allocate the modules of FIG. 2 using a thread pool based on Pthreads, to process the request. The Session Manager 511 may manage a communication session with the virtual reality application 510, and the IODev Manager 523 may manage handles of hardware devices which are currently used by the virtual reality input/output system 520. The RT signal Manager 524 may manage a high resolution timer used to process real-time calls.

Hereinafter, an operation of initializing the virtual reality input/output daemon 402 as a main process in the virtual reality input/output system 520 will be exemplarily described. The virtual reality input/output system 520 may create a daemon process as a parent process and perform signal remapping using a Daemonize( ) function. After changing a related directory and standard input/output, the virtual reality input/output system 520 may call a VRIO_Daemon( ) function, so that the parent process may be terminated. The VRIO_Daemon( ) function may be used to generate a scheduler in real-time, and to initialize the high resolution timer to call transceiving data on a fixed time. Also, the VRIO_Daemon( ) function may be used to initialize the virtual reality input/output proxy module described above with reference to FIG. 1, and to initialize the IODev Manager 523 and the RT signal Manager 524 described above with reference to FIG. 5. In addition, the VRIO_Daemon( ) function may be used to generate a thread pool to assist streaming, and used to generate threads related to the modules of FIG. 2 and register the generated threads in the thread pool. The generated threads may be activated by a call in response to a request from the virtual reality application 510, and may perform their respective functions, so that virtual reality data required by the virtual reality application 510 may be generated. After registering the threads in the thread pool, the VRIO_Daemon( ) function may initialize desired virtual reality input data. Also, the VRIO_Daemon( ) function may start the VRIOServer 521, after initializing communication between the modules of FIG. 2 and the virtual reality input/output daemon 402.

Figure 6:
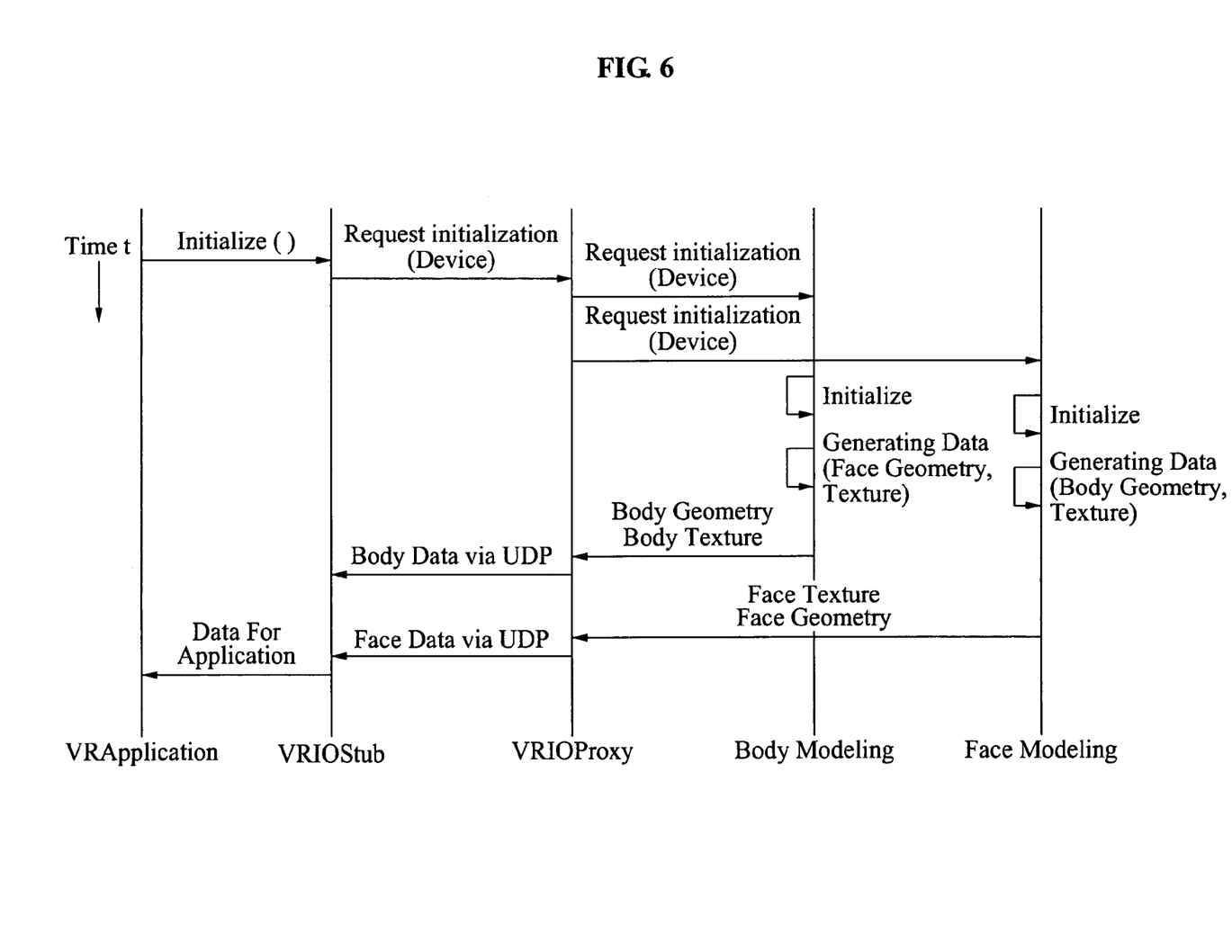
FIG. 6 illustrates an example of a sequence for face and body modeling according to embodiments.

FIG. 6 illustrates an example of a sequence for face and body modeling according to embodiments. When a virtual reality application transmits an initialization command to a module for body modeling and face modeling using a function defined in the virtual reality input/output stub module described with reference to FIG. 1, a virtual reality input/output system may receive the initialization command through the virtual reality input/output proxy module described with reference to FIG. 1, and may transfer the received initialization command to corresponding modules, so that each of the corresponding modules may generate desired virtual reality data. Specifically, the virtual reality input/output system may transfer the initialization command to the module for avatar body modeling 206 and module for avatar face modeling 205 described above with reference to FIG. 2 to realize body modeling and face modeling, respectively. Accordingly, the module for avatar body modeling 206 and module for avatar face modeling 205 may generate virtual reality data regarding the face geometry, the face texture, the body geometry and the body texture. In this instance, the virtual reality input/output system may cause the generated virtual reality data to be transmitted to the virtual reality application using the function defined in the virtual reality input/output stub module through the virtual reality input/ output proxy module. The virtual reality application may use the received virtual reality data to create a realistic avatar.

Figure 7:
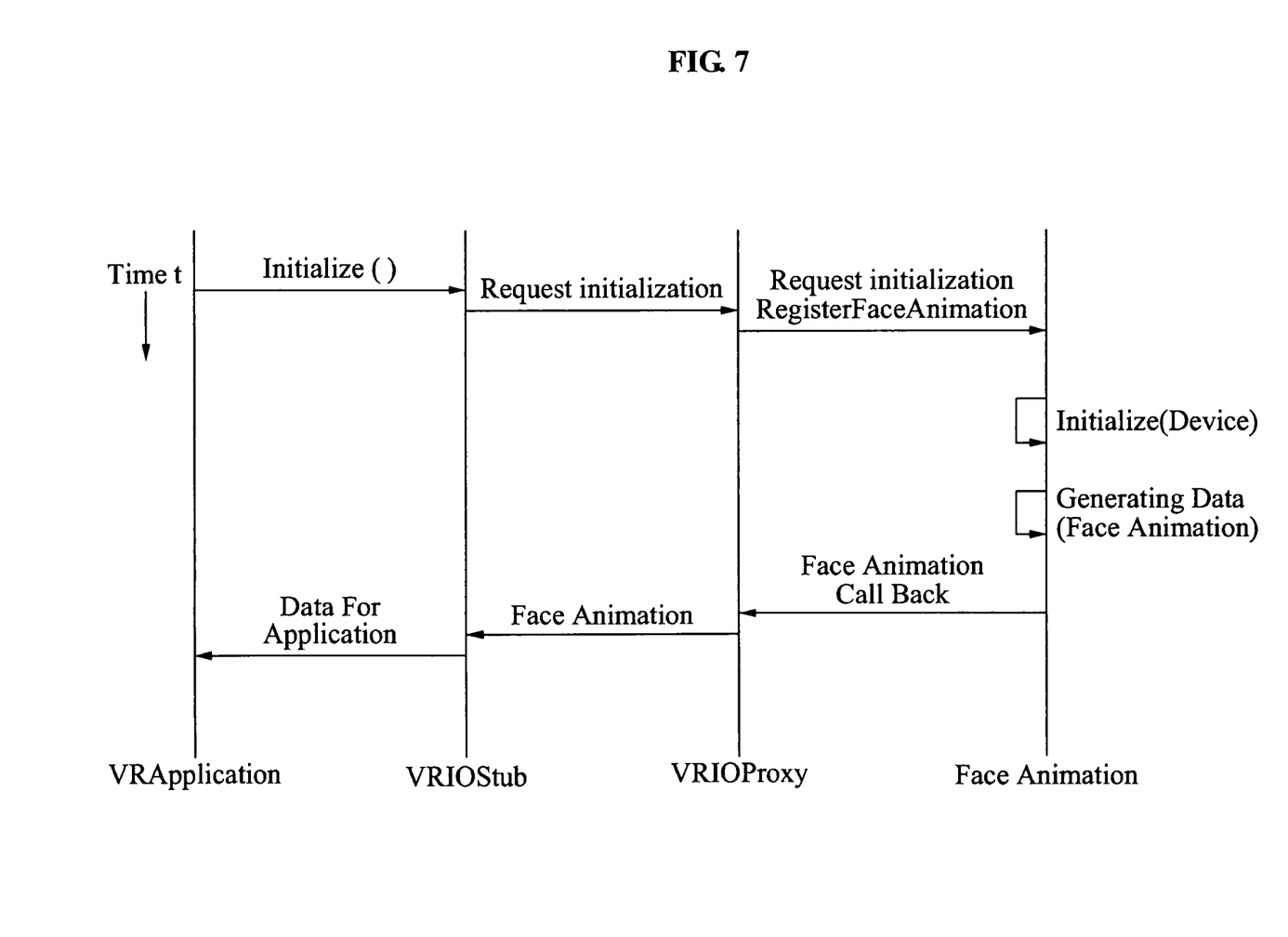
FIG. 7 illustrates an example of a sequence for face animation according to embodiments.
Figure 8:
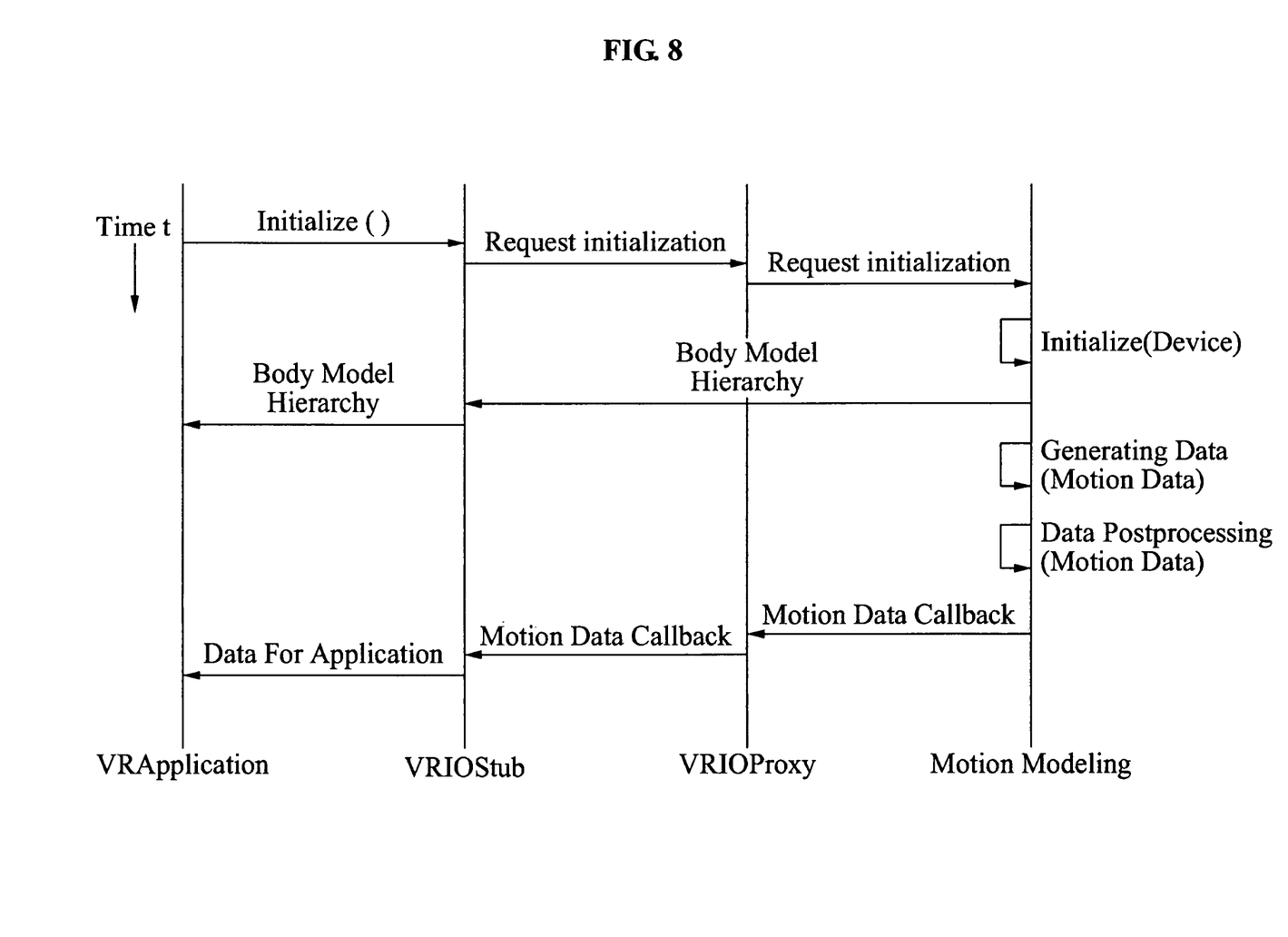
FIG. 8 illustrates an example of a sequence for motion modeling according to embodiments.
Figure 9:
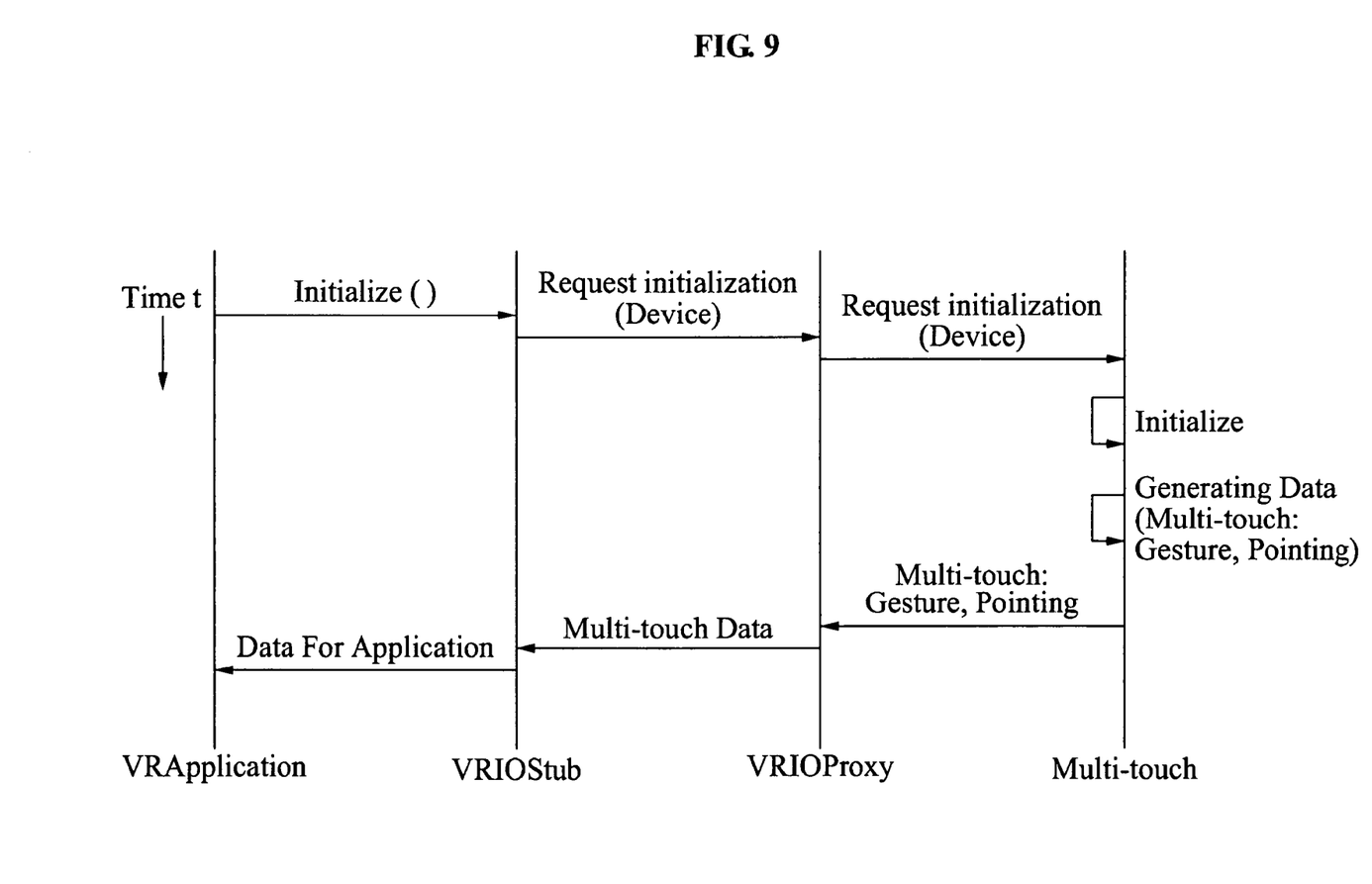
FIG. 9 illustrates an example of a sequence for a remote multi-touch according to embodiments.

FIGS. 7 to 9 illustrate examples of sequences for face animation, motion modeling and remote multi-touch according to embodiments. As described above with reference to FIG. 6, the virtual reality application may transmit the initialization command to a corresponding module, and the corresponding module may generate virtual reality data requested by the virtual reality application in response to the initialization command in the virtual reality input/output system, and may transmit the generated virtual reality data to the virtual reality application. For example, the modules for facial expression generation 204, avatar motion modeling 208, and remote multi-touch processing 207 described above with reference to FIG. 2 may be used to realize the face animation, motion modeling, and remote multi-touch, respectively. The above modules may generate virtual reality data corresponding to the face animation, motion modeling, and remote multi-touch, and may transmit the generated virtual reality data to the virtual reality application. The virtual reality data generated by the module for facial expression generation 204 may be used to describe changes in facial expression of an avatar, and the virtual reality data generated by the module for avatar motion modeling 208 may be used to control motions of the avatar. Also, the virtual reality data generated by the module for remote multi-touch processing 207 may be used to form gestures of the avatar. Here, the virtual reality input/output stub module and the virtual reality input/output proxy module may also be used to transmit the initialization command and the virtual reality data, as described above with reference to FIG. 6.

As described above, since the virtual reality input/output stub module and the virtual reality input/output proxy module may communicate with each other through one of a TCP-based network protocol, a UDP-based network protocol, and through the IPC, the plurality of virtual reality input devices or the virtual reality input/output system may be independent on a content execution environment. Service sessions may be maintained and managed for each virtual reality application through the thread pool and the Session Manager 522 described above with reference to FIG. 5, and therefore, it is possible to support execution of contents at the same time as using a client-server structure.

Figure 10:
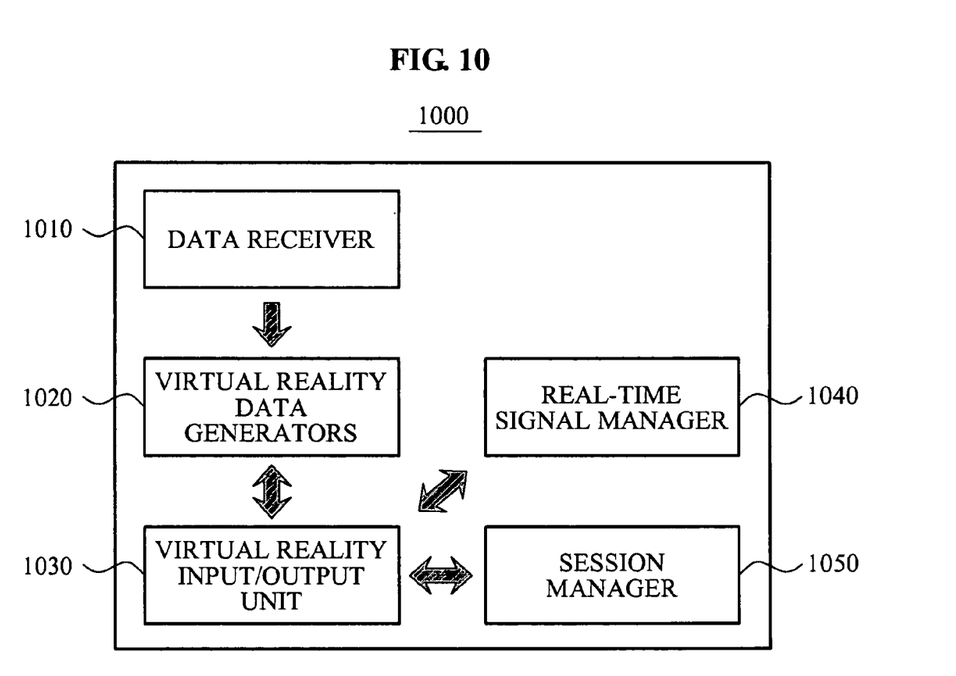
FIG. 10 illustrates a block diagram of a virtual reality input/output system according to embodiments.

FIG. 10 illustrates a block diagram of a virtual reality input/output system 1000 according to embodiments. In FIG. 10, the virtual reality input/output system 1000 may include a data receiver 1010, a plurality of virtual reality data generators 1020, a virtual reality input/output unit 1030, a real-time signal manager 1040 and a session manager 1050.

The data receiver 1010 may receive data from a plurality of virtual reality input devices. Here, the plurality of virtual reality input devices may include at least one of a color camera, a depth camera, and a motion sensor. In other words, the virtual reality input devices may be implemented as any device acquiring information used to create an avatar of a user, for example a user's facial expression, a user's motion, and a user's body geometry.

The plurality of virtual reality data generators 1020 may generate corresponding virtual reality data based on the received data. Specifically, each of the plurality of virtual reality data generators 1020 may generate the virtual reality data based on data regarding at least one of a face geometry, a face texture, a face animation, a body geometry, a body texture, a body motion, a body gesture, and a remote multi-touch gesture, based on the data received from the plurality of virtual reality input devices. The plurality of virtual reality data generators 1020 may correspond to, for example, the modules for facial expression generation 204, avatar face modeling 205, avatar body modeling 206, remote multi-touch processing 207, and avatar motion modeling 208 as described above with reference to FIG. 2, respectively. The method of generating the virtual reality data has been described in detail with reference to FIGS. 2 and 3 and thus, redundant descriptions are omitted herein.

The virtual reality input/output unit 1030 may transfer a request from at least one of a plurality of virtual reality applications to at least one corresponding virtual reality data generator among the plurality of virtual reality data generators 1020, and may transfer virtual reality data to the virtual reality application which transmits the request. In this instance, the at least one virtual reality data generator may process data corresponding to the request among the received data, to generate the virtual reality data based on the processed data.

Specifically, the virtual reality input/output unit 1030 may relay a communication between the plurality of virtual reality applications and the plurality of virtual reality data generators 1020, and a communication between the plurality of virtual reality input devices and the plurality of virtual reality data generators 1020. In this instance, the virtual reality input/output unit 1030 may perform, using a thread pool, scheduling and load balancing for each request received from each of the plurality of virtual reality applications and for the data received from each of the plurality of virtual reality input devices, and may then transfer the request and data to a corresponding virtual reality data generator among the plurality of virtual reality data generators 1020. In other words, a single process may be used to perform the scheduling and load balancing.

Also, the virtual reality input/output unit 1030 may combine and manage different function blocks in the same manner as the plurality of virtual reality data generators 1020, rather than the respective virtual reality applications directly setting the virtual reality input devices and acquiring and processing data. Thus, it is possible to more efficiently and stably manage devices in a centralized management scheme.

The virtual reality input/output unit 1030 may communicate with the plurality of virtual reality applications using a network protocol independent from a predetermined OS, or using an IPC. Accordingly, it is possible to generate and transmit virtual reality data regardless of the execution environment of virtual reality applications, and thus the virtual reality input/output unit 130 may provide services without problem even though different content execution environments of the virtual reality applications.

The real-time signal manager 1040 may manage a high resolution timer. In this instance, the virtual reality input/output unit 1030 may transmit virtual reality data corresponding to the request in real-time to the virtual reality application, which transmits the request, using the high resolution timer. In other words, the virtual reality input/output unit 1030 may use the high resolution timer to process requests from the virtual reality applications in real-time.

Virtual reality data having a generation frequency equal to or less than a predetermined value among the virtual reality data may be transmitted to a virtual reality application that requests the virtual reality data. Virtual reality data having a generation frequency exceeding the predetermined value among the virtual reality data may be transmitted in real-time to a corresponding virtual reality application when corresponding virtual reality data is generated after an initial request. For example, virtual reality data having a low generation frequency, for example a face geometry or a body geometry, may be transmitted using a request-respond scheme where data is transmitted only once per request. Virtual reality data having a high generation frequency, for example a face animation or a body motion, may be transmitted using a callback registration-callback scheme. The callback registration-callback scheme may enable data to be streamed in real-time at 30 frames or more per second. In this instance, the high resolution timer may be used to perform real-time streaming.

The session manager 1050 may manage a communication session for each of the plurality of virtual reality applications. Specifically, the session manager 1050 may manage the communication session for each of the plurality of virtual reality applications, and may provide a client-server communication structure, to thereby support execution of contents regarding the plurality of virtual reality applications at the same time.

The VRES may include at least one virtual reality application and the virtual reality input/output system 1000, as shown in FIG. 1, to receive virtual reality data and use the received virtual reality data. Alternatively, the VRES may be connected to the virtual reality input/output system 1000 as a separate system, to receive virtual reality data and use the received virtual reality data.

Figure 11:
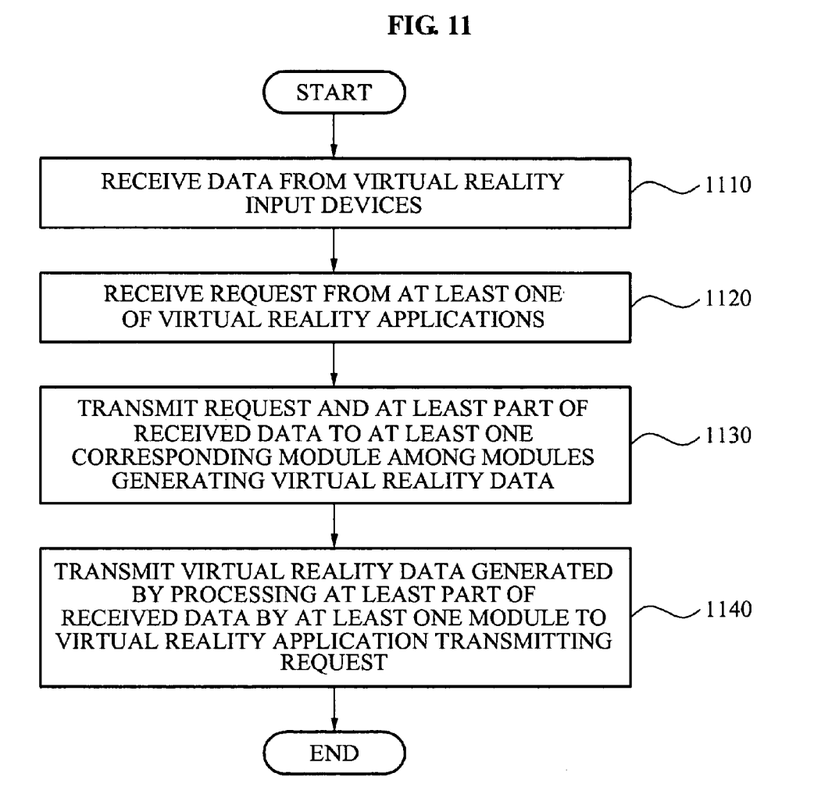
FIG. 11 illustrates a flowchart of a virtual reality input/output method according to embodiments.

FIG. 11 illustrates a flowchart of a virtual reality input/output method according to embodiments. The virtual reality input/output method of FIG. 11 may be performed by the virtual reality input/output system 1000 of FIG. 10. Operations of the virtual reality input/output method will be described with reference to FIG. 11.

In operation 1110, the virtual reality input/output system 1000 receives data from a plurality of virtual reality input devices. Here, the plurality of virtual reality input devices may include at least one of a color camera, a depth camera, and a motion sensor. In other words, the virtual reality input devices may be implemented as any device to acquire information used to create an avatar of a user, for example, a user's facial expression, a user's motion, and a user's body geometry.

In operation 1120, the virtual reality input/output system 1000 receives a request from at least one of a plurality of virtual reality applications. Here, the request may be received from the at least one of the plurality of virtual reality applications through a network protocol independent from a predetermined OS, or using an IPC. Virtual reality data that will be described below may be transmitted to the plurality of virtual reality applications through the network protocol or the IPC. In other words, the virtual reality input/output system 1000 may communicate with each of the plurality of virtual reality applications through the network protocol or the IPC, in order to provide virtual reality inputs and outputs regardless of execution environment of each of the virtual reality applications.

In operation 1130, the virtual reality input/output system 1000 transmits the request and at least part of the received data to at least one corresponding module among a plurality of modules which generate virtual reality data. Each of the plurality of modules may generate virtual reality data based on data regarding at least one of a face geometry, a face texture, a face animation, a body geometry, a body texture, a body motion, a body gesture, and a remote multi-touch gesture, among the data received from the plurality of virtual reality input devices. The plurality of modules may respectively correspond to, for example, the modules for facial expression generation 204, avatar face modeling 205, avatar body modeling 206, remote multi-touch processing 207, and avatar motion modeling 208 as described above with reference to FIG. 2. The method of generating the virtual reality data has been described in detail with reference to FIGS. 2 and 3, and thus redundant descriptions are omitted herein. Also, the virtual reality input/output system 1000 may perform, using a thread pool, scheduling and load balancing for each request received from each of the plurality of virtual reality applications and for the data received from each of the plurality of virtual reality input devices, and transfer the request and data to a corresponding module among the plurality of modules.

In operation 1140, the virtual reality input/output system 1000 transmits virtual reality data to the virtual reality application which transmits the request. Here, the at least one module may process the at least part of data to generate the virtual reality data. As described above, the virtual reality data may also be transmitted to the plurality of virtual reality applications through the network interface or the IPC.

Also, although not shown in FIG. 11, the virtual reality input/output system 1000 may further perform managing a high resolution timer, and managing a communication session for each of the plurality of virtual reality applications. For example, in operation 1140, the virtual reality input/output system 1000 may transmit the virtual reality data corresponding to the request in real-time to the virtual reality application, which transmits the request, using the high resolution timer.

As described above, according to the virtual reality input/output system and virtual reality input/output method in embodiments, it is possible to transceive input and output data using a network protocol independent from a predetermined system or an IPC, regardless of an execution environment such as an OS. Also, it is possible to combine and manage different function blocks, such as motion sensing, 3D capturing, facial expression tracking and remote multi-touch, in a single process, and to service virtual reality data in real-time using a high resolution timer, so that a user's shape such as body motions or facial expressions may be reflected to an avatar in real-time. It is also possible to collectively manage data received from a plurality of virtual reality input devices using a thread pool, to thereby perform scheduling and load balancing. In addition, it is possible to maintain and manage sessions for each application in a single process, and to provide services in a client-server scheme, to thereby support execution of contents at the same time. Also, it is possible to provide a fault-tolerant virtual reality input/output system by individually operating a single process and a virtual reality application, so that there is no effect on a stability in playback of contents. Moreover, it is possible to provide virtual reality data with various forms and characteristics using different schemes depending on a generation frequency, to thereby prevent a waste of computer resources.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments have been shown and described, the present disclosure is not limited to the described embodiments. Instead, it would be appreciated by those skilled in the art that changes may be made to these embodiments without departing from the principles and spirit of the disclosure, the scope of which is defined by the claims and their equivalents.

What is claimed is:

1. A virtual reality input/output system comprising:
    a data receiver to receive data from a plurality of virtual reality input devices;
    a plurality of virtual reality data generators, using at least one processor, to generate corresponding virtual reality data based on the received data; and
    a virtual reality input/output unit to transfer a request from at least one of a plurality of virtual reality applications to at least one corresponding virtual reality data generator among the plurality of virtual reality data generators, and to transfer virtual reality data to the virtual reality application which transmits the request, the virtual reality data being generated by processing data corresponding to the request among the received data by the at least one corresponding virtual reality data generator,
    wherein the virtual reality input/output system communicates with a virtual reality input/output stub module through a virtual reality input/output proxy module so that the virtual reality input/output system transmits generated virtual reality data to the virtual reality input/output stub module through the virtual reality input/output proxy module so that virtual reality applications receive the requested virtual reality data.

2. The virtual reality input/output system of claim 1, wherein the virtual reality input/output unit performs, using a thread pool, scheduling and load balancing for each request received from each of the plurality of virtual reality applications and for the data received from each of the plurality of virtual reality input devices, and wherein the virtual reality input/output unit transfers the request and data to a corresponding virtual reality data generator among the plurality of virtual reality data generators.

3. The virtual reality input/output system of claim 1, wherein the virtual reality input/output unit communicates with the plurality of virtual reality applications using a network protocol independent from a predetermined Operating System (OS).

4. The virtual reality input/output system of claim 1, further comprising:
    a real-time signal manager to manage a high resolution timer,
    wherein the virtual reality input/output unit transmits the virtual reality data corresponding to the request in real-time to the virtual reality application, which transmits the request, using the high resolution timer.

5. The virtual reality input/output system of claim 1, further comprising:
    a session manager to manage a communication session for each of the plurality of virtual reality applications.

6. The virtual reality input/output system of claim 1, wherein the plurality of virtual reality input devices comprise at least one of a color camera, a depth camera, and a motion sensor.

7. The virtual reality input/output system of claim 1, wherein each of the plurality of virtual reality generators generates the virtual reality data based on data regarding at least one of a face geometry, a face texture, a face animation, a body geometry, a body texture, a body motion, a body gesture, and a remote multi-touch gesture, among the data received from the plurality of virtual reality input devices.

8. The virtual reality input/output system of claim 1, wherein virtual reality data having a generation frequency equal to or less than a predetermined value among the virtual reality data is transmitted to a virtual reality application that requests the virtual reality data, and
    wherein virtual reality data having a generation frequency exceeding the predetermined value among the virtual reality data is transmitted in real-time to a corresponding virtual reality application whenever corresponding virtual reality data is generated after an initial request.

9. A system to receive the virtual reality data from the virtual reality input/output system of claim 1, the system comprising at least one of the plurality of virtual reality applications.

10. A virtual reality input/output method comprising:
    receiving data from a plurality of virtual reality input devices;
    receiving a request from at least one of a plurality of virtual reality applications through a virtual reality input/output stub module and a virtual reality input/output proxy module;
    transmitting the request and at least part of the received data to at least one corresponding module among a plurality of modules, the plurality of modules generating virtual reality data using at least one processor; and
    transmitting virtual reality data to the virtual reality application which transmits the request through the virtual reality input/output stub module and the virtual reality input/output proxy module, the virtual reality data being generated by processing the at least part of the received data by the at least one module.

11. The virtual reality input/output method of claim 10, wherein the transmitting of the request and the at least part of the received data to the at least one corresponding module comprises performing, using a thread pool, scheduling and load balancing for each request received from each of the plurality of virtual reality applications and for the data received from each of the plurality of virtual reality input devices, and transmitting the request and data to a corresponding module among the plurality of modules.

12. The virtual reality input/output method of claim 10, wherein the request is received from the plurality of virtual reality applications using a network protocol independent from a predetermined Operating System (OS), and
    wherein the virtual reality data is transmitted to the plurality of virtual reality applications using the network protocol.

13. The virtual reality input/output method of claim 10, further comprising:
    managing a high resolution timer,
    wherein the transmitting of the virtual reality data to the virtual reality application which transmits the request comprises transmitting the virtual reality data corresponding to the request in real-time to the virtual reality application, which transmits the request, using the high resolution timer.

14. The virtual reality input/output method of claim 10, further comprising:

managing a communication session for each of the plurality of virtual reality applications.

15. At least one non-transitory computer readable recording medium storing computer readable instructions that control at least one processor to implement the virtual reality input/output method of claim 10.

* * * * *